(12) United States Patent
Andrews et al.

(10) Patent No.: US 7,212,696 B2
(45) Date of Patent: May 1, 2007

(54) FIBER OPTIC DAMAGE DETECTION SYSTEM FOR COMPOSITE PRESSURE VESSELS

(75) Inventors: Thomas L. Andrews, Newport Beach, CA (US); Lorie R. Grimes-Ledesma, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/463,668

(22) Filed: Aug. 10, 2006

(65) Prior Publication Data

US 2006/0291767 A1 Dec. 28, 2006

Related U.S. Application Data

(63) Continuation of application No. 10/781,162, filed on Feb. 18, 2004, now Pat. No. 7,113,660.

(51) Int. Cl.
*G02B 6/42* (2006.01)
*H04B 10/08* (2006.01)

(52) U.S. Cl. .......................................... 385/13; 385/21
(58) Field of Classification Search ..................... None
See application file for complete search history.

(56) References Cited

U.S. PATENT DOCUMENTS 3,981,592 A * 9/1976 Williams .................... 356/73.1
4,724,316 A 2/1988 Morton ........................ 250/227

FOREIGN PATENT DOCUMENTS

EP 0892244 A2 1/1999

* cited by examiner

*Primary Examiner*—Michelle Connelly-Cushwa
*Assistant Examiner*—Jerry T Rahll
(74) *Attorney, Agent, or Firm*—Klein, O'Neill & Singh, LLP; Tejinder Singh

(57) ABSTRACT

An optical fiber wound onto an exterior surface of a composite structure in a two-dimensional pattern and adhered thereto to detect damage to the structure caused by impacts to or handling of the composite structure.

13 Claims, 2 Drawing Sheets

FIBER OPTIC DAMAGE DETECTION SYSTEM FOR COMPOSITE PRESSURE VESSELS

CROSS-REFERENCE TO RELATED APPLICATION

This application is a continuation of U.S. patent application Ser. No. 10/781,162, filed Feb. 18, 2004, which is now U.S. Pat. No. 7,113,660, which is herein incorporated by reference in its entirety.

BACKGROUND OF THE INVENTION

1. Field of the Invention

This invention relates to non-destructive testing methods and apparatus in general, and in particular, to the use of optical fibers as an indicator of damage to filament wound composite pressure vessels.

2. Related Art

A number of important fiber reinforced composite structures are currently being manufactured using filament winding. They are made in a broad range of sizes, and are categorized primarily by their application. Aerospace applications include vessels for high-pressure gas containment, liquid propellant tanks, and solid rocket motors. Such vessels are also used extensively in non-Aerospace applications, but are normally designed to be much more robust, as weight control is typically not as critical. Currently, solid rocket motor cases of up to 5 feet in diameter are being made, and even larger sizes are possible. They typically have an elastomeric liner/insulator on the inside of the case wall.

Another class of composite pressure vessels are made for containment of gasses at high pressures, and are usually relatively small, typically less than two feet in diameter. Those with thin metal liners are defined by the American Institute of Aeronautics and Astronautics (AIAA) in specification S0-81 as "Composite Overwrapped Pressure Vessels," or "COPVs". There are also high pressure gas containment composite pressure vessels with non-metallic liners that have been used for commercial applications. Very large liquid-containing propellant tanks have been made and these usually have a flexible liner on the composite wall for fuel containment. Typically, an epoxy-wetted fiber is wound in specified hoop and helical patterns on either a metallic liner, in the case of COPVs, or on a removable mandrel, and either with or without a liner at the winding stage. Features common to all composite pressure vessels used in aerospace applications are their relatively thin structural walls and thin metallic or elastomeric liners, which are used to minimize weight, and which render them relatively susceptible to shock and impact damage.

A preferred fiber for filament wound structures is carbon (graphite) fiber, which is exceptionally strong, but local deflections are limited before breakage occurs. Surface impact events experienced by these structures can cause significant local deflections resulting in broken fibers. The deflections can be elastic in nature, with no visual indication of subsurface fiber breakage or surface damage evident. The reduction in strength of the composite structure resulting from broken fibers can have implications that range from the need for relatively low-cost repairs, to a catastrophic failure of the vessel that can lead to calamitous failure of a flight vehicle. Unfortunately, not all impact events that occur subsequent to production inspection and that result in broken fibers are visually observed and reported through appropriate channels so that a detailed inspection is initiated to evaluate vessel integrity.

The susceptibility to impact damage of composite pressure vessels can be mitigated somewhat through design by providing for adequate strength after visible impact damage has occurred and been confirmed by visual inspection. However, for some high performance composite structures that are weight critical, such measures are not feasible, and multiple inspections are therefore necessary to ensure structural integrity. Accordingly, some space vehicle programs may expend very large sums of money each year to re-inspect solid rocket motor cases for impact damage using traditional non-destructive inspection methods prior to launch. Because of these high costs, new apparatus and methods for detecting impact or handling damage in composite structures are needed.

Some efforts have been made in this area to decrease the time and cost of traditional non-destructive inspections, including embedding sensing devices into woven fiber cloth, or co-curing them between laminate plies. (See, e.g., U.S. Pat. No. 5,814,729 to Wu, et al.; U.S. Pat. No. 5,245,180 to Sirkis; Claus, et al., "Nondestructive Evaluation of Composite Materials by Pulsed Time Domain Methods in Imbedded Optical Fibers," Review of Progress in Quantitative Nondestructive Evaluation Vol. 5B, Thompson and Chimenti Eds., Plenum Press, 1986; Maslouhi, et al., "Use of Embedded Optical Fiber Sensors for Acoustic Emission Detection Within Composite Materials," 36th International SAMPE Symposium, Apr. 15–18, 1991.) These references describe so-called "smart structures" that are equipped with sensing devices that indicate when a ply has been damaged. The drawback of these structures lies in the embedding within them of fiber optic sensors, which are typically larger than the adjacent structural ply fibers, and which therefore can adversely affect the strength of the lay-up or sustain embedded fiber damage during the curing process.

A need therefore exists for a low cost yet reliable method and apparatus for detected shock, impact, handling and transportation damage to composite pressurized structures.

BRIEF SUMMARY OF THE INVENTION

In accordance with the present invention, a reliable, low cost apparatus and method of use are provided for detecting structural damage incurred by a filament wound composite pressure vessel. In one advantageous embodiment, the damage detector comprises an optical fiber wound onto an exterior surface of the composite structure and adhered thereto with an adhesive. The core of the optical fiber may be silica, to approximate the tensile strength and frangibility of the filaments of the underlying composite structure. Advantageously, the optical fiber may be wound onto the underlying structure while wetted with a coating of a liquid epoxy resin, and the resin then cured to adhere the fiber to the structure. The optical fiber is preferably wound on the composite structure in a regular, two-dimensional pattern in which adjacent windings are spaced at a selected distance from each other, and in which points along the length of the fiber are mapped onto specific, known locations on the surface of the underlying structure. The winding pattern may comprise either helical or axial windings, or both.

Means are provided for transmitting a light signal though the optical fiber, and for detecting the signal after its transmission therethrough. In one possible embodiment, a laser or a light emitting diode may be used to inject the light signal into an end of the optical fiber, and a diode, such as an avalanche photo diode, may be used to detect the transmitted light signal. The light signal may be injected at a first end of the optical fiber and detected at the opposite second end thereof, or alternatively, may be injected at a first end of the fiber, reflected back from the opposite second end, and then detected at the first end. Preferably, the light transmitter and detector are implemented as small, portable units that are separate from the optical fiber, but easily connectable to it in the field by optical connectors.

Immediately after the optical fiber is applied to the underlying structure, a first, or baseline, test is conducted with the apparatus to determine a unique reference signal, or "signature," of the undamaged optical fiber. This reference or signature signal represents a completely uninterrupted signal traveling at least once through the fiber. Then, after the composite structure has been subjected to the shocks, impacts and handling of transportation and/or installation, a second signal similar to the first is sent though the optical fiber detector in a manner similar to the first and compared with the original reference or signature signal. Receipt of substantially the same baseline reference signature signal from the device indicates that no intervening fiber breakage has occurred to the structure, whereas, substantial changes detected in the signal indicate that the structure may have sustained structural damage that may not be obvious to visual inspection, but which could be detected by conventional non-destructive methods, such as ultrasonic techniques.

In an alternative embodiment, a pulsed light signal is injected into one end of the fiber, reflected back from the second end, and then detected at the first end. Any discontinuity in the fiber occasioned by shock or impact damage thereto will result in a reflected light signal that "leads," i.e., is detected earlier than, the input signal reflected from the second end of the fiber. The amount of time taken by the reflected light signal to travel from the first end of the fiber to the discontinuity and back to the first end is measured, and the distance of the discontinuity from the first end of the optical fiber then computed from the time taken. When this distance is located on the above two-dimensional map of the optical fiber on the exterior surface of the composite structure, the location of the discontinuity, and hence, the location of potential damage to the underlying structure, is revealed precisely.

A better understanding of the above and many other features and advantages of the present invention may be obtained from a consideration of the detailed description thereof below, particularly if such consideration is made in conjunction with the several views of the appended drawings.

BRIEF DESCRIPTION OF THE SEVERAL VIEWS OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE INVENTION

Figure 1:
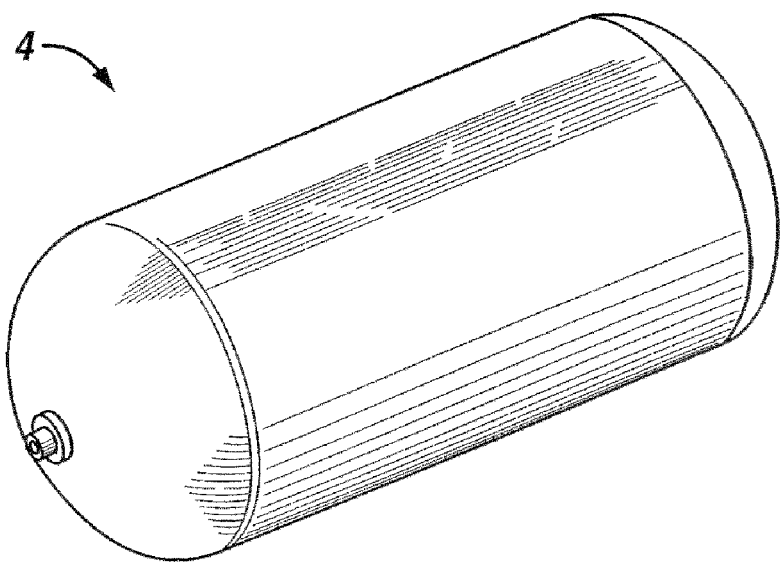
FIG. 1 is a perspective view of a liner or mandrel for a composite pressure vessel before being wrapped with a reinforcing fiber-and-epoxy composite matrix.
Figure 2:
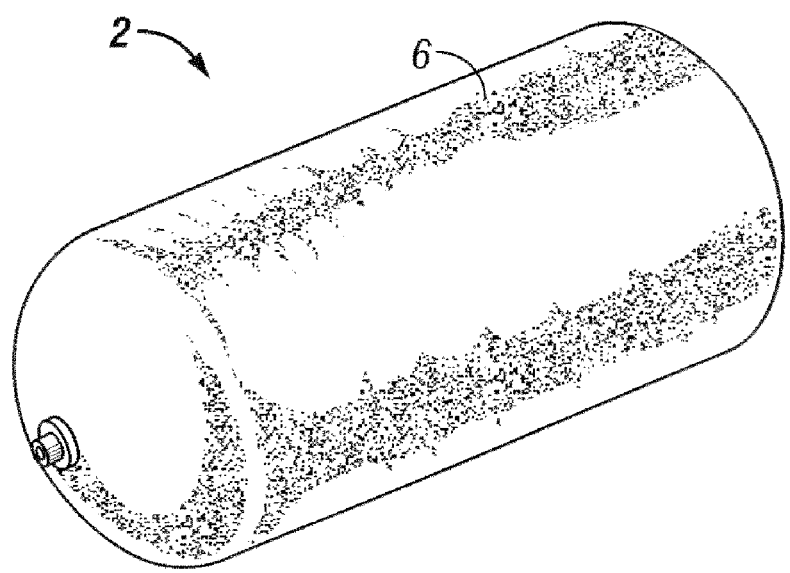
FIG. 2 is a perspective view of the liner or mandrel of FIG. 1 after being wrapped with a reinforcing fiber-and-epoxy matrix to form a composite pressure vessel.

A filament-wound composite structure 2, viz., a composite overwrapped pressure vessel, or COPV, to which the present invention has advantageous application, is illustrated in the perspective view of FIG. 2. The particular composite pressure vessel illustrated comprises a liquid propellant tank, and includes a hollow, generally cylindrical, polymeric or metallic, e.g., plastic, titanium, aluminum or stainless steel, inner liner 4, such as that illustrated in FIG. 1. While the liner is shown as cylindrical in shape, it should be understood that such a liner may have many other shapes, including, e.g., oblate spheroids, "near spheres," or spheres. The underlying mandrel for the composite pressure vessel could also be a solid propellant casting or a mechanically removable or dissolvable structure (e.g. salt or plaster) that is not an integral component of the final pressure vessel.

The exterior surface of the liner 4 may be densely over-wound in a helical and/or longitudinal pattern with a reinforcing fiber, typically a Kevlar (poly(p-phenylene-terephtalamide)) or Aramid, carbon and/or glass fiber, and coated with or embedded in a continuous layer of a cured epoxy resin, which fills the interstices of the fiber windings and forms a strong, reinforcing matrix 6 that is initially supported by the liner, and which becomes an independent structural element after the epoxy binder is cured and an underlying mandrel removed. Winding can be accomplished through either "wet-winding," comprising dipping fibers into a resin bath prior to wrapping them over the liner, or by "pre-preg winding," comprising winding a tape of fibers that have been previously impregnated with resin onto the liner.

While the reinforcing fibers of the matrix have a tensile-strength-to-weight ratio that is many times greater than that of equivalently sized metallic fibers, they are also substantially more brittle, and therefore, more susceptible to breakage from shear forces caused by localized shock and impacts incurred by the structure during moving, handling or in-service abuse. To some extent, the resin bed serves to protect the fibers from such types of damage, but filament wound composite structures nevertheless remain particularly susceptible to damage caused by fiber breakage, and such damage is often hard to detect by a visual inspection of the structure.

Figure 3:
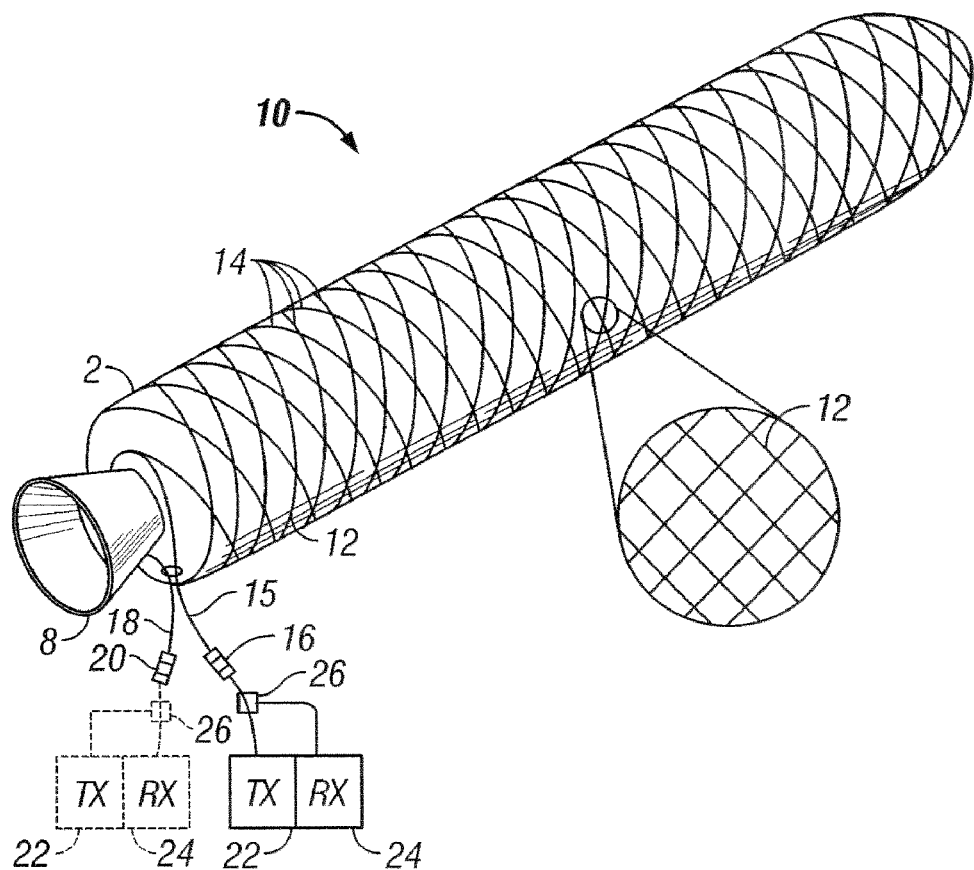
FIG. 3 is a perspective view of the composite pressure vessel after the application thereto of an exemplary embodiment of a damage detector in accordance with the present invention.

A composite pressure vessel 2 having an exemplary embodiment of a damage detector 10 applied thereto in accordance with the present invention is illustrated in the perspective view of FIG. 3. The vessel illustrated comprises a cylindrical solid rocket motor case having an exhaust nozzle 8 disposed at one end thereof. The damage detector comprises an optical fiber 12 wound onto the exterior surface of the structure in an open, uniform, two-dimensional pattern in which adjacent windings are spaced at a selected, uniform distance from each other, and adhered thereto in a bed of a cured, i e., solidified, resin, e.g., an epoxy or a polyurethane resin.

In the particular exemplary embodiment illustrated in FIG. 3, the winding pattern of the optical fiber 12 comprises overlapping helical windings 14 distributed along the long axis of the cylindrical motor case 2 such that they define a grid pattern of, for example, 0.5 in. spacing when laid flat on a two-dimensional "map" of the exterior surface of the underlying structure, as illustrated in the inset detail of the figure. Other winding patterns, such as longitudinal windings, may also be used, but it is desirable that the windings be applied with a spacing, or area density, that is likely to be affected by localized impacts acting at points on the structure that are located between adjacent windings, as well as those which act directly on the optical fiber itself. Additionally, it should be noted that, if the particular winding pattern of the optical fiber is known, together with the location of the beginning and end points thereof on the above surface map of the underlying structure, then every point along the length of the fiber will correspond to a known location on that map, and can be used to locate impact damage to the structure precisely, as described in more detail below.

The optical fiber 12 of the detector 10 may comprise either "plastic," ie., polymer-based, or conventional "glass," i.e., silica based, core and cladding material, the latter so as to better approximate the tensile properties of the reinforcing fibers of the underlying structure 2. The fiber may have, for example, a core diameter of between about 9 to 63 microns ("µ"), and an outer diameter, including cladding and any buffering, or reinforcing, layers, of about 125µ. Of course, the optical fiber may also have other sizes and constituent parts, and in this regard, it may be desirable to provide an optical fiber with minimal or no buffering layers to more closely mimic the frangibility of the fibers of the underlying structure, and to rely on a clear coating or paint, as described below, for protection against minor scratches and abrasions. The fiber may also be, for example, either a "single-mode" or a "multimode" fiber, depending on the particular application at hand. The former type may be preferable as typically having a smaller diameter core, and therefore, being more sensitive to the level of impacts that would adversely affect the fibers of the underlying structure, whereas, the latter type may be preferable in some applications because of its typically greater spectral "richness" caused by modal dispersion.

The optical fiber 12 may, like the underlying structure 2, be "wet-wound," i.e., coated with an uncured liquid resin during winding, which is subsequently cured at an elevated temperature. However, the embedding resin is preferably cured at a lower temperature than that at which the underlying structure is cured, such that no loss in strength will occur in the underlying structure by the application to it of the detector 10. During the winding of the optical fiber, a first "pigtail," or umbilical assembly 15 comprising a signal inlet/outlet connector 16, is adhered to the underlying structure to provide a signal inlet/outlet at a first end of the fiber, and in one possible embodiment, a second umbilical 18 with either a signal outlet connector or a reflector 20 may be disposed at the opposite, second end of the fiber, as illustrated in FIG. 3.

In another possible embodiment, shown in phantom in FIG. 3?, the second end of the fiber can simply be terminated at a right angle so as to act as a reflector, in a known manner, and additionally, may be located away from the first end, e.g., at the opposite end of the underlying structure 2. The umbilical arrangement may thus contain one or both ends of the optical fiber, as illustrated in FIG. 3, and may be applied at the beginning of the wet winding procedure. Although the umbilical assembly is adhered to the underlying structure, a majority of it may lie below the optical fiber after winding, thereby leaving only the signal inlet, and optionally, outlet connectors exposed. A light, clear coating of resin may be applied over the optical fiber/resin layer to protect it against minor handling scratches, as discussed above, and if desired, the entire assembly can be painted over. After the final cure of the respective resins and coatings, the optical fiber damage detection system is ready for use.

Immediately after the optical fiber 12 has been applied to the underlying structure 2, it is desirable to perform a first, or baseline, test with the apparatus 10 to determine a reference signal, or "signature," of the newly applied, undamaged optical fiber. This reference or signature signal represents a completely uninterrupted signal traveling at least once through the entire length of the fiber. To effect this test, a transmitter unit ("TX") 22, which may comprise a conventional light emitting diode ("LED") or a laser diode, is coupled to the inlet connector 16 of the fiber, and a receiver unit ("RX") 24, which may comprise a conventional PIN diode or an avalanche photodiode ("APD"), is coupled to the outlet connector 20 of the fiber, as illustrated schematically in FIG. 4. Alternatively, where the second end of the fiber comprises a signal reflector 20, both the transmitter and the receiver may be coupled to the signal inlet/outlet connector 16 of the fiber, which may also include a signal coupler 26 to avoid the need for an integrated transmitter/receiver device, as illustrated schematically in FIG. 5.

Figure 4:
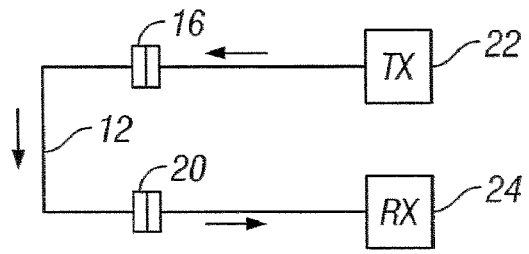
FIG. 4 is a schematic diagram of an exemplary embodiment of a damage detector in accordance with the present invention; and, FIG. 5 is a schematic diagram of another exemplary embodiment of a damage detector in accordance with the present invention.
Figure 5:
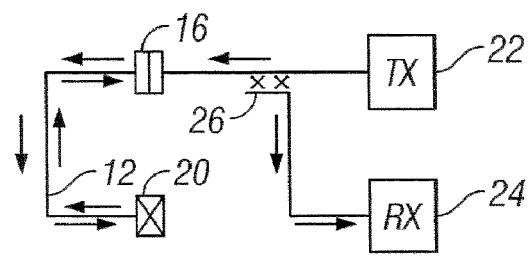

In the embodiment of FIG. 4, the light signal is injected into the first end of the fiber, travels once through the length of the fiber, and is detected at the second end of the fiber. In the embodiment of FIG. 5, the light signal is injected into the first end of the fiber, is reflected back from the second end of the fiber such that it travels the length of the fiber twice, and is then detected at the first end of the fiber. In yet another possible embodiment (not illustrated), it is possible to provide a "partial-reflector" at the second end of the fiber such that a portion of the light signal is reflected back to the first end of the fiber, while the remaining portion passes out the second end thereof. The two portions of the signal can then be compared with each other, either before or after detection.

After the reference signal of the fiber is established, it is recorded and can be analyzed for amplitude or intensity, phase and spectral content. Then, after the composite structure 2 has been subjected to the shocks, impacts and handling of transportation and/or installation, a second signal substantially similar to the reference signal is sent through the optical fiber detector 10 in a manner substantially similar to that in which the reference signal was sent and detected, and the two signals then compared, which may include fast-fourier analysis, to assess potential intervening damage to the underlying structure. Thus, receipt of substantially the same baseline reference signal from the device indicates that no intervening fiber breakage has occurred to the structure, whereas, substantial changes detected in the second signal indicate that the structure may have sustained structural damage which may not be visible to visual inspection, but which can be detected by conventional non-destructive methods, such as ultrasonic or x-ray techniques. For example, damage to the optical fiber which exposes even a small portion of the core of the fiber, or which results in a "kink" in the core, but which does not result in any discontinuity in the core itself, will nevertheless result in a loss of in the second signal, which may be easily detected, and provide either a critical "go/no-go" indication, or alternatively, the need for the application of extensive conventional non-destructive examination methods to the structure, such as ultrasonic or x-ray techniques, to assess the location, nature and extent of the damage. Further, in a system with fiber optic connectors at each end of the composite pressure vessel, a second signal can be sent from the opposite end to verify that multiple damage locations do not exist beyond the initial finding that would require a complete non-destructive inspection of the structure to validate its over-all integrity.

Where damage to the optical fiber 12 of the detector 10 results in a discontinuity in the core of the fiber, at least a portion of a test signal injected into the fiber will be reflected back from the discontinuity to the first end of the fiber. In an embodiment of the detector that detects a reflected signal at the first end of the fiber, such as that illustrated in FIG. 5, the signal reflected from the discontinuity provides a mechanism for precisely locating the damage, in the following maimer. In such an embodiment a pulsed light signal is injected into one end of the fiber. The signal reflected back from the discontinuity "leads," ie., is detected earlier than, the input signal reflected from the second end of the fiber. The amount of time taken by the reflected light signal to travel from the first end of the fiber to the discontinuity and back to the first end is measured, and the distance of the discontinuity from the first end of the optical fiber is then computed from the time taken. When this distance is plotted on the two-dimensional map of the optical fiber on the exterior surface of the composite structure described above, the location of the discontinuity, and hence, the location of the potential damage to the underlying structure, is thereby revealed with substantial accuracy.

As will by now be evident to persons of skill in the art, many modifications, substitutions and variations can be made in and to the materials, configurations and methods of use of the reliable, low-cost damage detector 10 of the present invention without departing from its spirit and scope. Accordingly, the scope of the present invention should not be limited to the particular embodiments illustrated and described herein, as they are merely exemplary in nature, but rather, should be fully commensurate with that of the claims appended hereafter and their functional equivalents.

What is claimed is:

1. Apparatus for detecting structural damage to a composite pressure vessel, the apparatus comprising:
    an optical fiber having a first end and a second end adhered to an exterior surface of the composite pressure vessel;
    an injector operable to inject a light signal into the first end of the optical fiber; and,
    a detector operable to detect a reflected portion of the light signal at the first end of the optical fiber,;
    a reflector coupled at the second end of the optical fiber operative to reflect a light signal injected into the first end of the optical fiber back to the first end thereof; and
    means for measuring the amount of time taken by the reflected light signal to travel from the first end of the fiber to the reflector and back to the first end.

2. The apparatus of claim 1, wherein the composite pressure vessel comprises a high pressure gas storage vessel, a liquid propellant tank, or a solid rocket motor case.

3. The apparatus of claim 1, further comprising:
    a comparator operable to compare first and second light signals injected into the optical fiber at different times.

4. The apparatus of claim 1, wherein the composite pressure vessel comprises a composite over-wrapped pressure vessel ("COPV").

5. The apparatus of claim 1, further comprising a fiber optic connector at the first end of the optical fiber.

6. The apparatus of claim 1, wherein the light signal injector further comprises a pulser operable to pulse the light signal injected into the optical fiber.

7. The apparatus of claim 1, wherein the light signal injector comprises a laser or a light emitting diode.

8. The apparatus of claim 1, wherein the detector comprises a PIN diode or an avalanche photodiode.

9. The apparatus of claim 1, wherein the optical fiber includes a core comprising silica or a polymer.

10. The apparatus of claim 1, wherein the optical fiber is adhered to the exterior surface of the composite pressure vessel with a resin.

11. The apparatus of claim 10, wherein the optical fiber is embedded in the resin.

12. An apparatus for detecting structural damage to a filament wound composite pressure vessel, apparatus comprising:
    an optical fiber;
    means for injecting first and second light signals into an end of the optical fiber at different times;
    means for detecting a reflected light signal corresponding to a discontinuity in the optical fiber;
    means for measuring the amount of time taken by the reflected light signal to travel from the first end of the fiber to the discontinuity and back to the first end; and
    means for computing the distance of the discontinuity from the first end of the optical fiber from the time taken.

13. The apparatus of claim 12, wherein the light signal comprises a pulsed light signal.

* * * * *

UNITED STATES PATENT AND TRADEMARK OFFICE
CERTIFICATE OF CORRECTION

| | |
|---|---|
| PATENT NO. | : 7,212,696 B2 |
| APPLICATION NO. | : 11/463668 |
| DATED | : May 1, 2007 |
| INVENTOR(S) | : Thomas L. Andrews and Lorie R. Grimes-Ledesma |

It is certified that error appears in the above-identified patent and that said Letters Patent is hereby corrected as shown below:

- The word "though" at Column 2, line 63 should read as --through--
- The phrase "shown in phantom in FIG. 3?," at Column 5, line 60 should read as --shown in phantom in FIG. 3,--

Signed and Sealed this

Twelfth Day of June, 2007

JON W. DUDAS
*Director of the United States Patent and Trademark Office*